US011962600B2

(12) United States Patent
Uprit

(10) Patent No.: US 11,962,600 B2
(45) Date of Patent: Apr. 16, 2024

(54) APPARATUS AND METHODS FOR SECURE, DISTRIBUTED, AUGMENTED-REALITY (AR) COMMUNICATION SYSTEMS

(71) Applicant: Bank of America Corporation, Charlotte, NC (US)

(72) Inventor: Saurabh Uprit, Chennai (IN)

(73) Assignee: Bank of America Corporation, Charlotte, NC (US)

( * ) Notice: Subject to any disclaimer, the term of this patent is extended or adjusted under 35 U.S.C. 154(b) by 387 days.

(21) Appl. No.: 17/501,029

(22) Filed: Oct. 14, 2021

(65) Prior Publication Data
US 2023/0119556 A1     Apr. 20, 2023

(51) Int. Cl.
| | | |
|---|---|---|
| *H04L 9/00* | (2022.01) | |
| *G06F 21/62* | (2013.01) | |
| *G06N 20/00* | (2019.01) | |
| *H04L 9/40* | (2022.01) | |
| *H04L 65/401* | (2022.01) | |
| *H04L 67/131* | (2022.01) | |

(52) U.S. Cl.
CPC ........ *H04L 63/105* (2013.01); *G06F 21/6245* (2013.01); *G06N 20/00* (2019.01); *H04L 63/102* (2013.01); *H04L 65/401* (2022.05); *H04L 67/131* (2022.05)

(58) Field of Classification Search
CPC .... H04L 63/105; H04L 65/401; H04L 63/102
USPC ............................................................ 726/1
See application file for complete search history.

(56) References Cited

U.S. PATENT DOCUMENTS

| | | | | |
|---|---|---|---|---|
| 11,475,158 B1 * | 10/2022 | Zhang | ..................... | G06N 3/096 |
| 2012/0290565 A1 * | 11/2012 | Wana | ..................... | G06F 16/958 |
| | | | | 707/723 |
| 2020/0380162 A1 * | 12/2020 | Eisen | ..................... | G06F 40/131 |

FOREIGN PATENT DOCUMENTS

WO    WO 2022/086578    *    4/2022    ............. G06F 21/60

OTHER PUBLICATIONS

"Method and System for Generating Augmented Reality Content on the Fly on a User Device," Argo, Apr. 23, 2019.
"Dynamic Panel Masking," Valve Corporation, Dec. 12, 2019.
(Continued)

*Primary Examiner* — Christopher J Brown
(74) *Attorney, Agent, or Firm* — Weiss & Arons LLP

(57) ABSTRACT

A method for maintaining security in a distributed augmented-reality (AR) system is provided. The method may include generating a database that includes a list of objects associated with sensitive information. The method may include receiving requests from a plurality of user devices to participate in an AR session, and determining an authorization level to associate with each of the plurality of user devices. The method may include receiving, from a first one of the plurality of user devices, an image that was scanned in via a camera of the first user device. The method may include processing the image to determine if the image includes one of the objects. When the image includes one of the objects, the method may include masking the object in the image. The method may include transmitting, for display in the AR session, the image with the masking to user devices with a default authorization level, and transmitting, for display in the AR session, the image without the masking to user devices with a trusted authorization level.

18 Claims, 5 Drawing Sheets

(56) References Cited

OTHER PUBLICATIONS

"Generating and Providing Augmented Reality Representations of Recommended Products Based on Style Similarity in Relation to Real-World Surroundings," Adobe Inc., Jun. 11, 2018.
"Input Control for Augmented Reality Applications," Amazon, Jan. 5, 2018.

* cited by examiner

APPARATUS AND METHODS FOR SECURE, DISTRIBUTED, AUGMENTED-REALITY (AR) COMMUNICATION SYSTEMS

FIELD OF TECHNOLOGY

Aspects of the disclosure relate to digital systems. Specifically, aspects of the disclosure relate to augmented-reality (AR) communication systems.

BACKGROUND OF THE DISCLOSURE

Augmented reality (AR) systems are digital systems that combine real world components with digital virtual components. For example, an AR system may include a user device, such as a pair of glasses, that provides a user with a view of the real world through the lenses. The lenses may also be configured to act as screens and support display of digital images. The real-world view is thus augmented with the digital images to provide a combined AR experience.

AR systems can be used across a variety of applications. One important application may be for communication systems. For example, an AR system can be used to facilitate a meeting even when meeting participants may be remote from each other. Each meeting participant may use an AR device that provides a view of real world surroundings augmented with digital images relevant to the meeting. The digital images may include views captured by cameras of other devices in the system.

A challenge faced by AR systems may relate to security. For example, a digital image may include sensitive information that may compromise an entity's safety or financial security if displayed on unauthorized devices.

It would be desirable, therefore, to provide apparatus and methods for AR systems with increased security.

SUMMARY OF THE DISCLOSURE

Aspects of the disclosure relate to secure, distributed, augmented-reality (AR) systems. The system may include a central server and a plurality of user devices in communication with the central server. The central server may include a processor and a non-transitory memory. The memory may store a database. The database may include a list of objects associated with sensitive information.

Each user device from the plurality of user devices may include a camera, a screen configured to provide a device user with an AR experience, and a communication interface.

The central server may be configured to receive requests from the plurality of user devices to participate in an AR session. The central server may also be configured to determine an authorization level to associate with each of the plurality of user devices. The authorization level may be one of a plurality of predetermined authorization levels. The plurality of predetermined authorization levels may include a default level and a trusted level.

The central server may be configured to receive, from a first one of the plurality of user devices, an image that was scanned in via the camera of the first user device. The central server may also be configured to process the image to determine if the image includes an object from the list of objects. When the image includes an object from the list of objects, the central server may be configured to mask the object in the image.

The central server may be configured to transmit the image with the masking to the user devices with a default authorization level for display during the AR session. The central server may be configured to transmit the image without the masking to the user devices with a trusted authorization level for display during the AR session.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
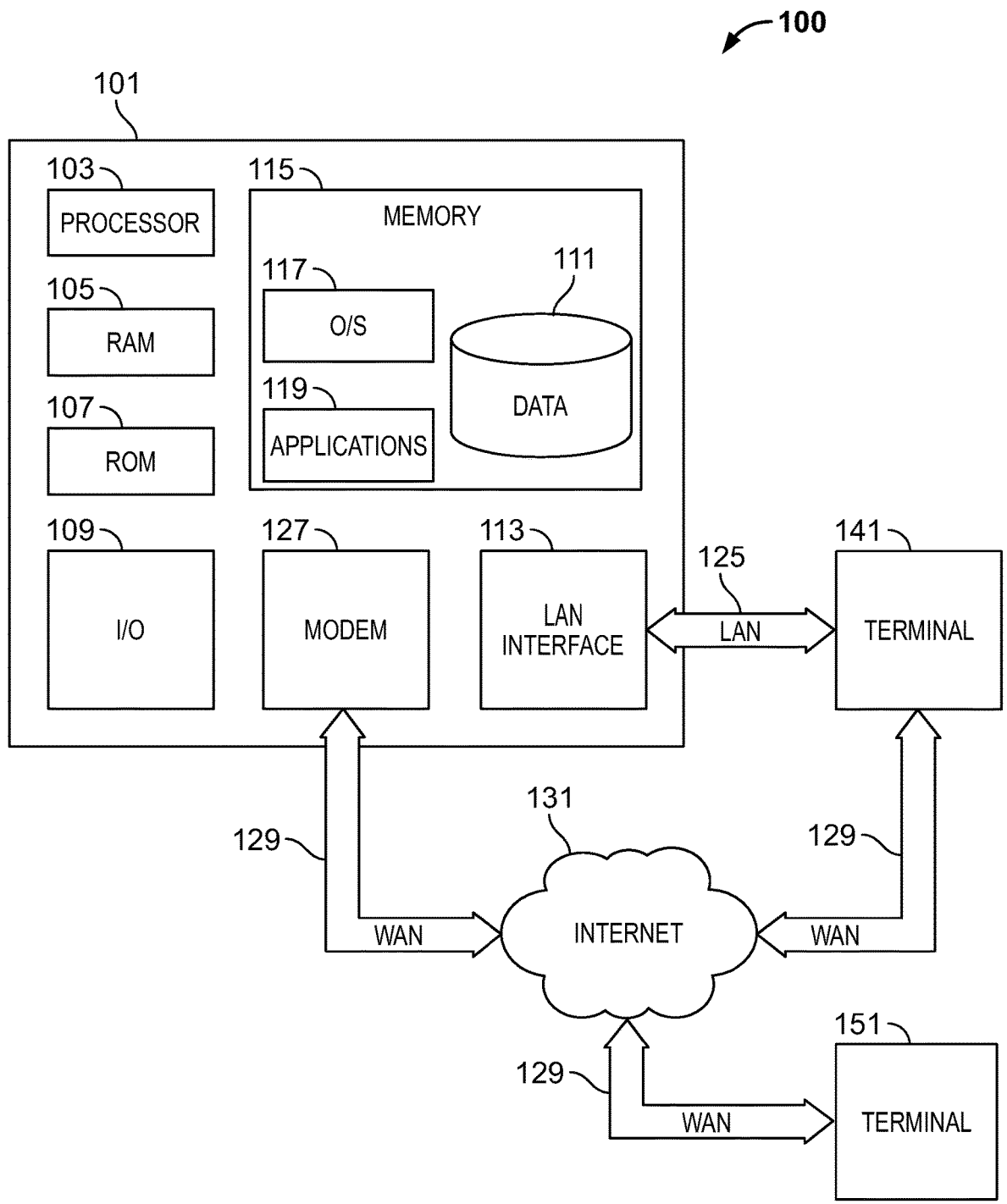
FIG. 1 shows an illustrative system in accordance with principles of the disclosure.

Aspects of the disclosure relate to secure, distributed, augmented-reality (AR) systems. The system may include a central server. The central server may be a physical central server. The central server may be a logical central server. The system may, in some embodiments, be wholly or partially cloud based.

The central server may include a processor and a non-transitory memory. The memory may store a database. The database may include a list of objects associated with sensitive information. Sensitive information may include any information that can directly or indirectly cause physical or emotional harm to an individual or entity. Sensitive information may include personally identifiable information (PII). PII refers to information that can be used to distinguish or trace an individual's identity, either alone or when combined with other personal or identifying information that is linked or linkable to a specific individual.

In some embodiments, the list of objects stored in the database may include physical objects. The physical objects may include objects that, if viewed, may expose sensitive information. Such objects may, for example, include sensitive documents and/or payment instruments. For example, the list may include certain contracts, agreements, letters, account summaries or statements, license plates, identification cards or documents, checks, credit or debit cards, apps, or other suitable documents or instruments that contain sensitive information.

In certain embodiments, the list of objects may include information. The information may include certain patterns or alphanumeric sequences that may be commonly associated with sensitive information. The information may include sequences associated with account numbers, identification numbers, social security numbers, names, addresses, signatures. For example, one of the objects in the list of objects may include any sequence of numbers in the form of XXX-XX-XXXX.

In some embodiments, the system may include a machine-learning (ML) engine. The database may be generated by feeding the ML engine with historical data that includes images containing sensitive information, training the ML engine, based on the historical data, to recognize graphical patterns associated with the sensitive information, and generating the list of objects based on the graphical patterns.

The system may include one or more user devices in communication with the central server. Each user device from the plurality of user devices may include a camera, a screen configured to provide a device user with an AR experience, and a communication interface. User devices may, for example, include smart glasses, goggles, displays (such as a "heads-up display"), or any other suitable device capable of providing a user with an AR experience.

The central server may be configured to receive requests from the plurality of user devices to participate in an AR session. The AR session may, for example, be a remote meeting. The central server may also be configured to determine an authorization level to associate with each of the plurality of user devices. The authorization level may be one of a plurality of predetermined authorization levels. The plurality of predetermined authorization levels may include a default level and a trusted level. In one example, the system may assign the user device that initiated the session with a trusted level and assign the other user devices with a default. In another example, the determination may be based at least in part on an identifier associated with the user device. The identifier may include a level of seniority or a rank. For example, the identifier may identify whether the user is an entry-level associate or a manager, and the system may assign a trusted authorization level to all users that are managers.

In another example, the determination of authorization level may be based at least in part on an association with a party of the session. For example, the session may include two parties that are discussing a potential deal. In this example, users on each side of the deal may be assigned a trusted authorization level with respect to other users on the same side of the deal.

The central server may be configured to receive, from a first user device, an image that was scanned in via the camera of the first user device. The image may be a single stationary image. The image may be a part of a moving image, for example, a still frame from a video clip.

The image may, for example, have been scanned in intentionally, e.g., via a dedicated scanner, for the purpose of disseminating to other users in the session. The image may also have been scanned without specific intent to share with the other users. For example, the user devices in the AR session may automatically scan in everything within field of vision of the device, and the scanned images may be transmitted to the central server for transmission to the screens of the other AR devices as part of the AR experience in the session.

The central server may also be configured to process the image to determine if the image includes an object from the list of objects. Processing the image may include using image processing software to recognize an object such as a credit card or account statement, that may be present in the image. Processing the image may also include detecting a pattern that may represent sensitive information, such as an alphanumeric sequence that may be an address, account number, or social security number.

When the image includes an object from the list of objects, the central server may be configured to mask the object in the image. In some embodiments, the masking includes a blurring of the object in the image. Blurring the object may include blurring the entire object. Blurring the object may include blurring just the portion of the object that is likely to include or show sensitive information. In other embodiments, the masking may include omitting the object from the image.

The central server may be configured to transmit the image with the masking to the user devices with a default authorization level for display during the AR session. The central server may be configured to transmit the image without the masking to the user devices with a trusted authorization level for display during the AR session.

In certain embodiments, one of the user devices that is associated with a trusted authorization level may also be associated with an administrative authorization level. When the first user device is associated with the administrative authorization level, the first user device may be provided the capability to direct the central server to transmit the image without the masking to a user device with a default authorization level.

In some embodiments, the authorization level associated with a user device may be reassessed based on an event during the AR session. To illustrate, in a scenario where the meeting is a potential agreement with a second party. The second party may be considered adverse, or unprivileged, with respect to the first party when the sessions begins, and the user devices associated with the second party may be assigned default authorization. If, however, during the course of the session an agreement is reached and the deal is executed, the second party may now be a trusted party and the user devices associated with the second party may be reassessed and assigned a trusted authorization level.

In certain embodiments, the authorization level associated with a user device may be reassessed based on a relationship between the user device and the object included in the image. For example, even when a user device is assigned a default level, the system may determine that the user device is trusted with respect to the object in the image, e.g., in a scenario where the object is owned or otherwise associated with that user.

In some embodiments, when the image includes an object from the list of objects, the system may determine whether storing the image without the masking in the memory is consistent with applicable data privacy laws and regulations. Data privacy laws and regulations may, for example, include 15 U.S.C. § 45, the Privacy Act of 1974 (5 U.S.C. § 552a), the Gramm-Leach-Bliley Act (15 U.S.C. §§ 6801-6809), the Fair Credit Reporting Act (15 U.S.C. § 1681 et seq.), the Children's Online Privacy Protection Act (15 U.S.C. §§ 6501-6506), Europe's General Data Protection Regulations (the GDPR), California Consumer Privacy Act (CCPA), and any other suitable law or regulation governing sensitive information.

When such storage is determined to be inconsistent with applicable data privacy laws and regulations, the system may execute an operation consistent with the laws and regulations. For example, the system may store the image with the masking. In some embodiments, the system may store the unmasked image with appropriate encryption. The system may also notify, and/or request permission from, the user, regarding storage and/or transmission of the sensitive information.

In certain embodiments, when the image includes an object from the list of objects, the system may transmit a request to the first user device for authorization to transmit the image without the masking to other user devices. In some embodiments, the request may be for authorization to transmit to user devices with a default authorization level. In other embodiments, the request may be for authorization to transmit to user devices with a trusted authorization level.

A method for maintaining security in a distributed augmented-reality (AR) system is provided. The method may include generating a database including a list of objects associated with sensitive information. The method may include receiving, at a central server, requests from a plurality of user devices to participate in an AR session. The method may include determining, at the central server, an authorization level to associate with each of the plurality of user devices. The authorization level may be one of a plurality of predetermined authorization levels. The plurality of predetermined authorization levels may include a default level and a trusted level.

The method may include receiving, at the central server, from a first one of the plurality of user devices, an image that was scanned in via a camera of the first user device. The method may include processing the image, at the central server, to determine if the image includes an object from the list of objects. When the image includes an object from the list of objects, the method may include masking the object in the image. The method may include transmitting, for display in the AR session, the image with the masking to the user devices with a default authorization level. The method may include transmitting, for display in the AR session, the image without the masking to the user devices with a trusted authorization level.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is understood that other embodiments may be utilized, and that structural, functional, and procedural modifications may be made without departing from the scope and spirit of the present disclosure.

FIG. 1 shows an illustrative block diagram of system 100 that includes computer 101. Computer 101 may alternatively be referred to herein as a "server" or a "computing device." Computer 101 may be a workstation, desktop, laptop, tablet, smart phone, or any other suitable computing device. Elements of system 100, including computer 101, may be used to implement various aspects of the systems and methods disclosed herein.

Computer 101 may have a processor 103 for controlling the operation of the device and its associated components, and may include RAM 105, ROM 107, input/output module 109, and a memory 115. The processor 103 may also execute all software running on the computer—e.g., the operating system and/or voice recognition software. Other components commonly used for computers, such as EEPROM or Flash memory or any other suitable components, may also be part of the computer 101.

The memory 115 may be comprised of any suitable permanent storage technology—e.g., a hard drive. The memory 115 may store software including the operating system 117 and application(s) 119 along with any data 111 needed for the operation of the system 100. Memory 115 may also store videos, text, and/or audio assistance files. The videos, text, and/or audio assistance files may also be stored in cache memory, or any other suitable memory. Alternatively, some or all of computer executable instructions (alternatively referred to as "code") may be embodied in hardware or firmware (not shown). The computer 101 may execute the instructions embodied by the software to perform various functions.

Input/output ("I/O") module may include connectivity to a microphone, keyboard, touch screen, mouse, and/or stylus through which a user of computer 101 may provide input. The input may include input relating to cursor movement. The input may relate to image scanning. The input/output module may also include one or more speakers for providing audio output and a video display device for providing textual, audio, audiovisual, and/or graphical output. The input and output may be related to computer application functionality. The input and output may be related to image scanning.

System 100 may be connected to other systems via a local area network (LAN) interface 113.

System 100 may operate in a networked environment supporting connections to one or more remote computers, such as terminals 141 and 151. Terminals 141 and 151 may be personal computers or servers that include many or all of the elements described above relative to system 100. The network connections depicted in FIG. 1 include a local area network (LAN) 125 and a wide area network (WAN) 129, but may also include other networks. When used in a LAN networking environment, computer 101 is connected to LAN 125 through a LAN interface or adapter 113. When used in a WAN networking environment, computer 101 may include a modem 127 or other means for establishing communications over WAN 129, such as Internet 131.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit a user to retrieve web pages from a web-based server. The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory.

Additionally, application program(s) 119, which may be used by computer 101, may include computer executable instructions for invoking user functionality related to communication, such as e-mail, Short Message Service (SMS), and voice input and speech recognition applications. Application program(s) 119 (which may be alternatively referred to herein as "plugins," "applications," or "apps") may include computer executable instructions for invoking user functionality related performing various tasks. The various tasks may be related to image scanning, processing, transmitting, and/or displaying.

Computer 101 and/or terminals 141 and 151 may also be devices including various other components, such as a battery, speaker, and/or antennas (not shown).

Terminal 151 and/or terminal 141 may be portable devices such as a laptop, cell phone, Blackberry™, tablet, smartphone, or any other suitable device for receiving, storing, transmitting and/or displaying relevant information. Terminals 151 and/or terminal 141 may be other devices. These devices may be identical to system 100 or different. The differences may be related to hardware components and/or software components.

Any information described above in connection with database 111, and any other suitable information, may be stored in memory 115. One or more of applications 119 may include one or more algorithms that may be used to implement features of the disclosure, and/or any other suitable tasks.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, mobile phones, smart phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 2:
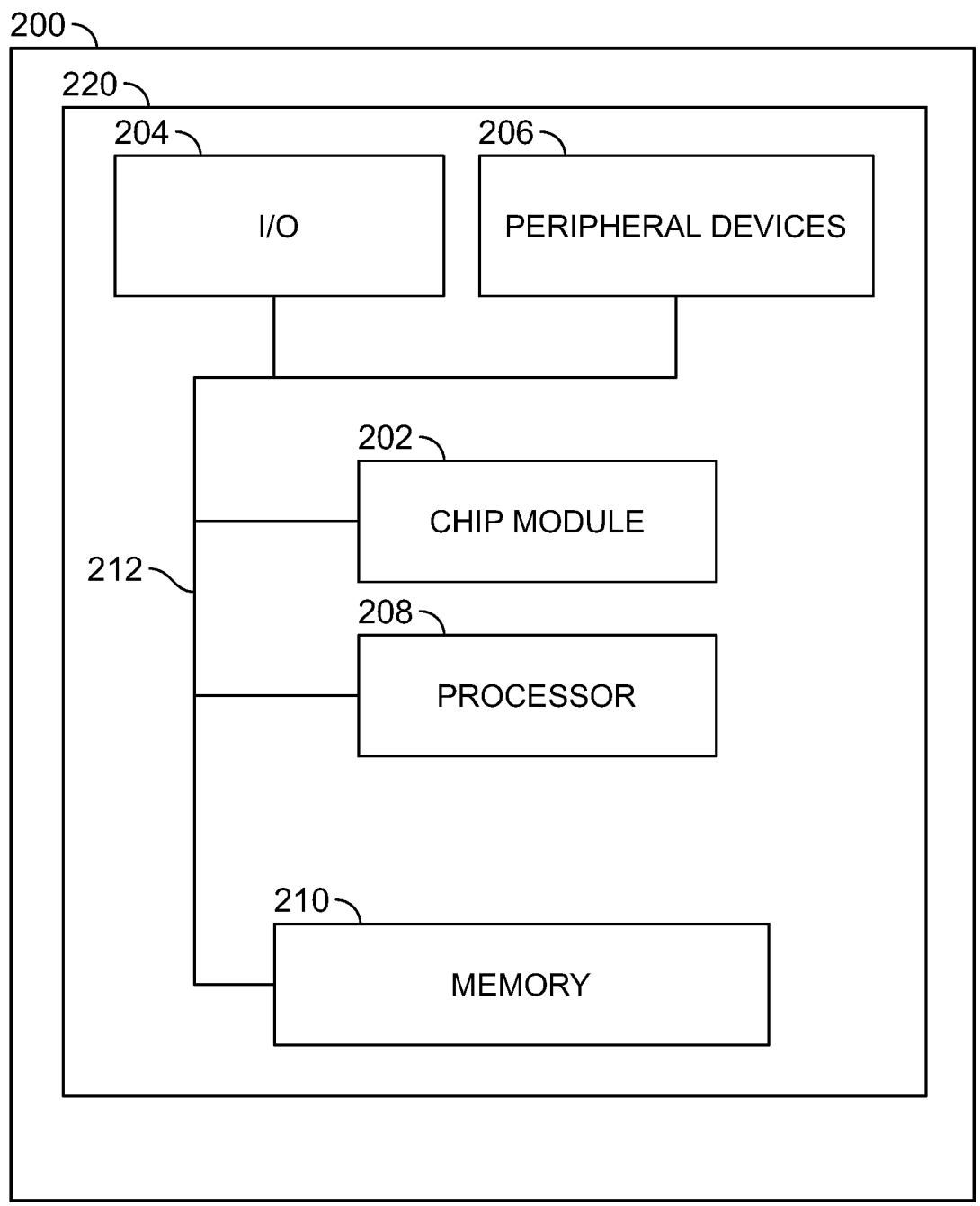
FIG. 2 shows an illustrative apparatus in accordance with principles of the disclosure.

FIG. 2 shows illustrative apparatus 200 that may be configured in accordance with the principles of the disclosure. Apparatus 200 may be a computing machine. Apparatus 200 may include one or more features of the apparatus shown in FIG. 1. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions (which may be alternatively referred to herein as "computer instructions" or "computer code"), applications, signals, and/or any other suitable information or data structures.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
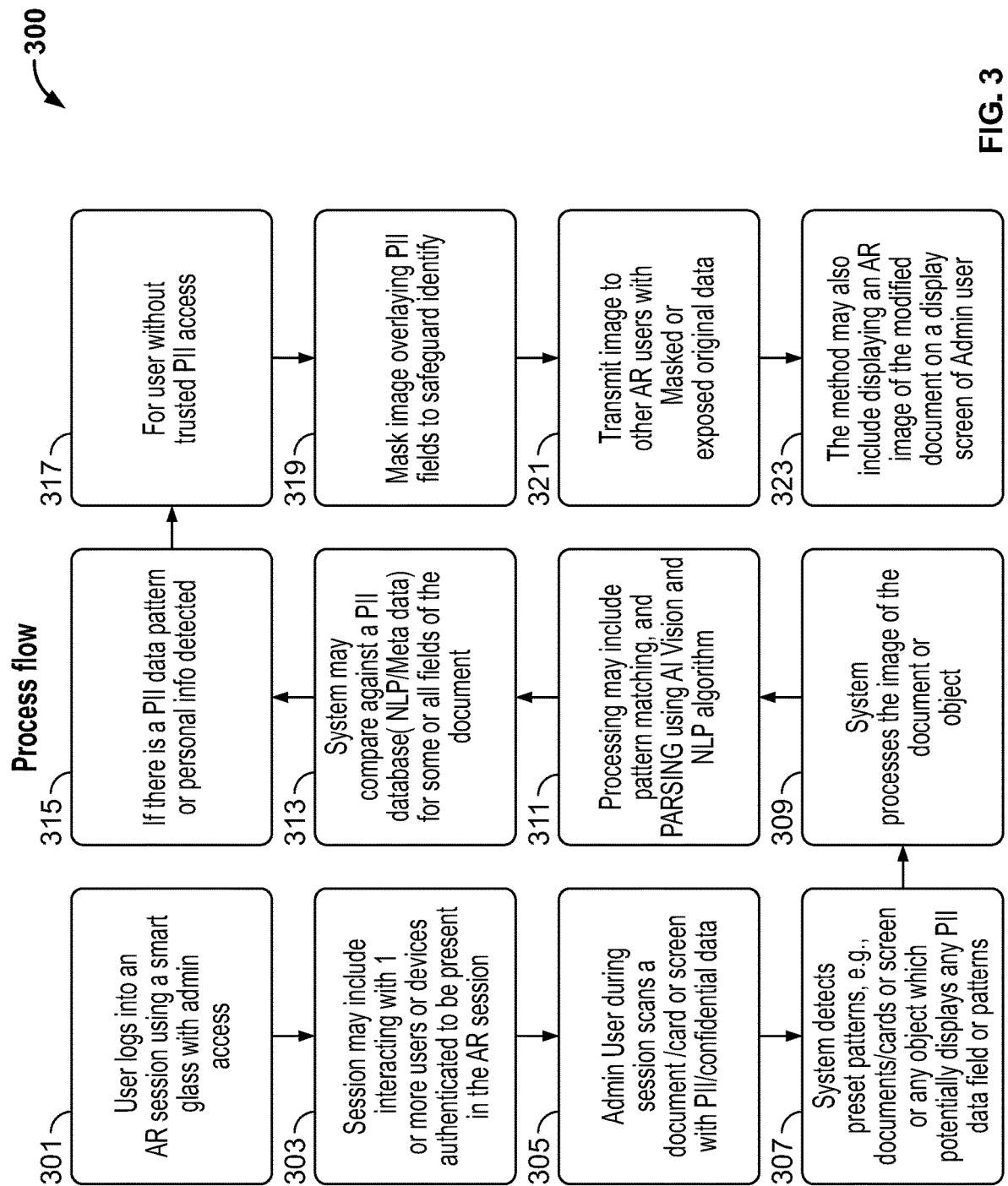
FIG. 3 shows an illustrative flowchart in accordance with principles of the disclosure.

FIG. 3 shows illustrative flowchart 300 in accordance with principles of the disclosure. Flowchart 300 begins at step 301 with a user logging in to an AR session. The user may have an AR enabled user device such as a pair of smart glasses. The user may log in via the device. In some embodiments, the user may log in via another computing device, such as a smart phone, tablet, or laptop or desktop computer, that may be connected (via a wire or wirelessly) to the user device. The user may have administrative access. The user may initiate the AR session.

At step 303 one or more other user devices may join the session. Joining the session may include an identification and/or authentication of the user devices. At step 305, the first user device (which may have admin credentials) may scan an image. The image may include a document, card, screen, or other object that may include confidential, PII, or otherwise sensitive information. At step 307 the system may detect that the image includes the object. At 309, the system may process the image. The detecting and processing may be executed locally at the user device. In other embodiments, the processing may be executed remotely, at a centralized server, or on the cloud.

Processing the image may include, at step 311, pattern matching or parsing using artificial intelligence (AI) vision, natural language processing (NLP), or any other suitable image processing tool. Pattern matching may include comparing a pattern present on the object against a list of patterns that are associated with sensitive information. The pattern may, for example, include an alphanumeric sequence of a certain format. In some embodiments, the system may process all the fields of the document, card, screen, or other object. In other embodiments, the system may only process the fields which have a high likelihood of containing sensitive information.

At step 313 the system may compare the results of the image processing against a database of sensitive information. If sensitive information is detected at step 315 based on the comparison, and for user devices at 317 with a default authorization level that do not have a trusted authorization level, the system may, at 319, mask the image to make the sensitive information not obtainable from the image. Based on the authorization level of the other user devices, the system may transmit the image at 321 with or without the masking. In some embodiments, the system may, at step 323, display the modified (i.e., masked) image on the device of the admin user to show the admin what the other users are being shown.

Figure 4:
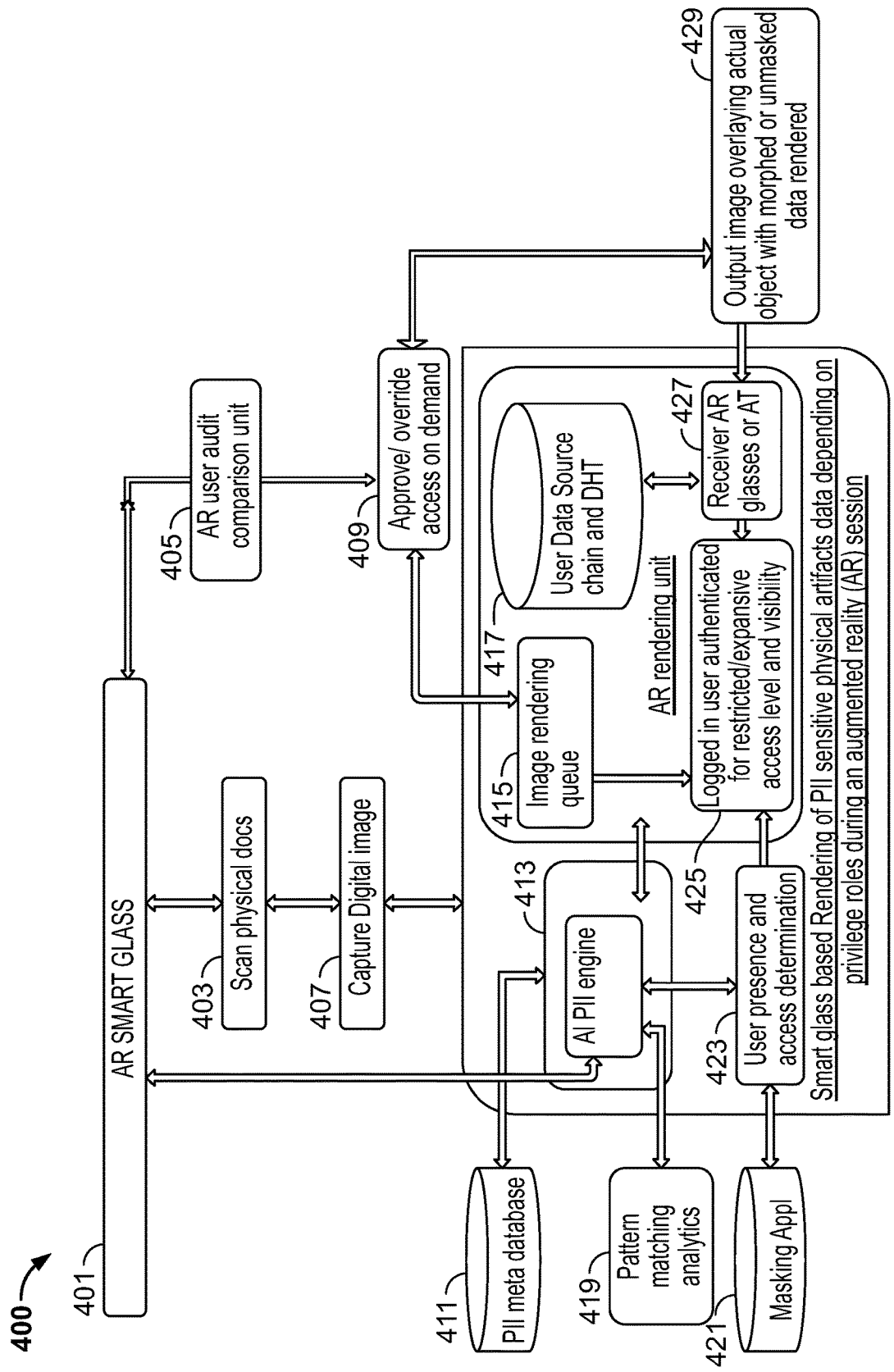
FIG. 4 shows an illustrative diagram in accordance with principles of the disclosure.

FIG. 4 shows illustrative diagram 400 in accordance with principles of the disclosure. Diagram 400 shows a system which includes AR smart glass 401 (which may, in other embodiments, be any other suitable AR-enabled user device). Smart glass 401 may scan an object such as a physical document at 403. Smart glass 401 may capture a digital image at 407. Capturing the image may be part of the scan. The image may be added to an image rendering queue 415 for processing. In some embodiments, the images may be processed first and may be added to the queue after being processed. Some embodiments may include a first queue prior to processing and a second queue post processing.

The system includes processing engine 413. Engine 413 may provide the processing power for some or all the features of the system. Engine 413 may employ artificial intelligence (AI). Engine 413 may access database 411 (e.g., for determining whether an image contains sensitive information). Engine 413 may use pattern matching analytics 419 as part of the determination.

Multiple users may be logged in to an AR session. The users may be authenticated and/or identified at 425. The authentication/identification may involve unit 405. Data regarding the users may be included in distributed hash table (DHT) 417. User authorization level, which may dictate access to the image, may be determined at 423. The determination may be based at least in part on the authentication/identification.

The system may mask the image using masking application 421. At 429, the system may transmit the image, in either the masked or unmasked form (depending on the determination of authorization level), to the receivers 427 of the user devices. There may also be a request 409 to approve access of the unmasked image even for a device that would not otherwise qualify.

Figure 5:
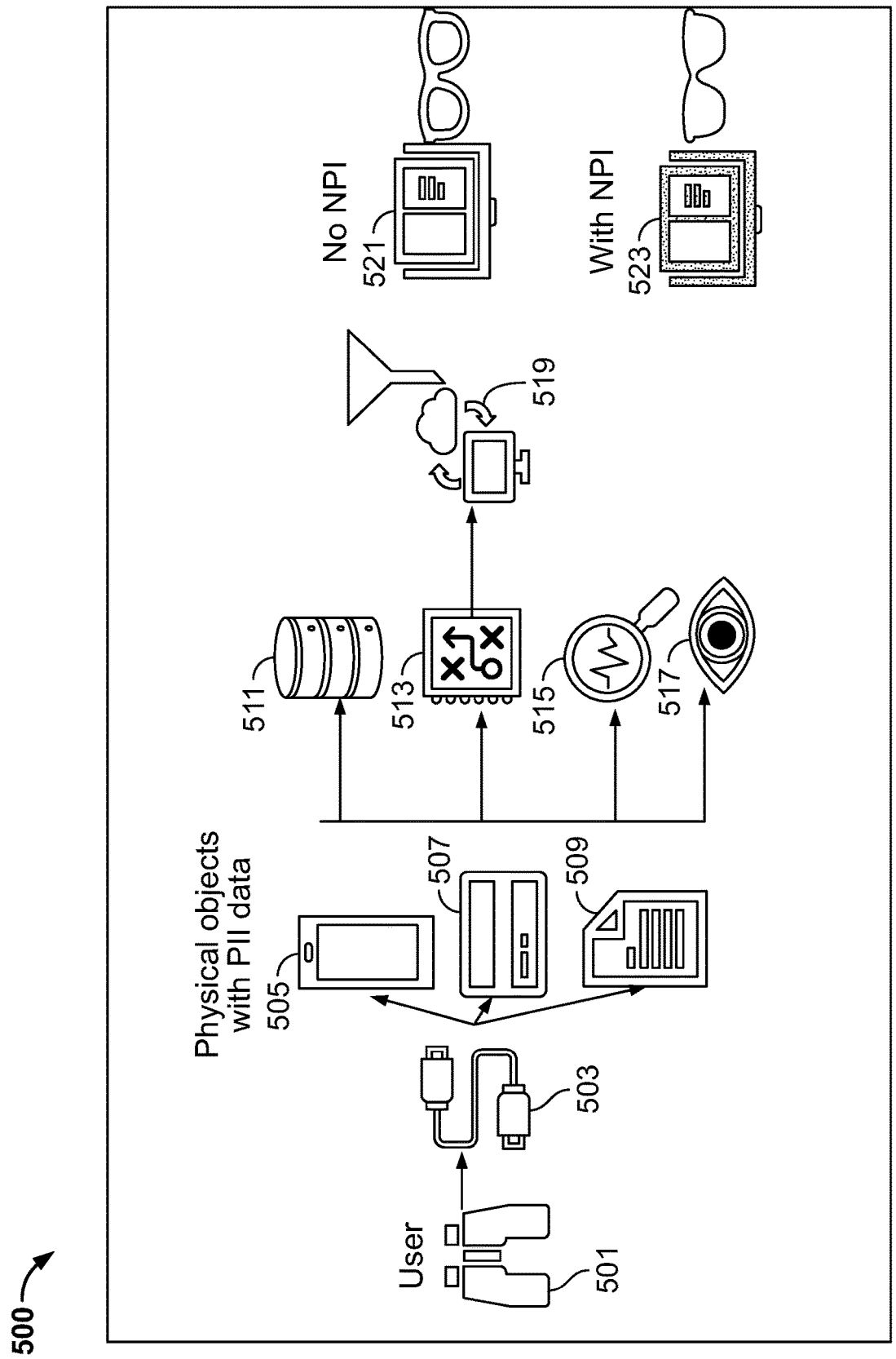
FIG. 5 shows another illustrative diagram in accordance with principles of the disclosure.

FIG. 5 shows illustrative diagram 500 of a system in accordance with principles of the disclosure. Diagram 500 shows user 501. User 501 may be connected (503) to the system, wired or wirelessly, via an AR-enabled device such as a pair of smart glasses or goggles. User 501 may capture an image of an object that may display sensitive information, such as computing device 505 (e.g., smart phone, tablet, laptop, desktop, etc.), payment instrument 507 (e.g., a credit card), or document 509 (e.g., a contract or agreement).

The system may include database 511, network 513 (e.g., for wired/wireless communication between multiple user devices and a server), pattern matching recognition 515, and/or computer vision technology 517. The system may, in some embodiments, be connected to, or through, cloud 519. If the image is determined not to include nonpublic personal information (NPI), the system may display the unedited image 521 to other users. If the image is determined to include NPI, the system may display an edited, or masked, image 523 to some or all other users.

The steps of methods may be performed in an order other than the order shown and/or described herein. Embodiments may omit steps shown and/or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown and/or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, methods and apparatus for secure, distributed, augmented-reality (AR) communication systems are provided. Persons skilled in the art will appreciate that the present invention can be practiced by other than the described embodiments, which are presented for purposes of illustration rather than of limitation, and that the present invention is limited only by the claims that follow.

What is claimed is:

1. A method for maintaining security in a distributed augmented-reality (AR) system, the method comprising:
   generating a database comprising a list of objects associated with sensitive information;
   receiving, at a central server, requests from a plurality of user devices to participate in an AR session;
   determining, at the central server, an authorization level to associate with each of the plurality of user devices, wherein said authorization level is one of a plurality of predetermined authorization levels, said plurality of predetermined authorization levels comprising a default level and a trusted level;
   receiving, at the central server, from a first one of the plurality of user devices, an image that was scanned in via a camera of the first user device;
   processing the image, at the central server, using image processing software to recognize an object present in the image, and using both pattern matching and parsing using artificial intelligence (AI) vision and natural language processing (NLP), to determine if the image includes an object from the list of objects, the pattern matching comprising detecting at least one alphanumeric sequence selected from at least one of an address, an account number, and a social security number;
   when the image includes an object from the list of objects, determining whether storing the image without the masking in the memory is consistent with applicable data privacy laws and regulations; and
   when storing the image without the masking in the memory is inconsistent with applicable data privacy laws and regulations, masking the object in the image, and storing the image with the masking;
   transmitting, for display in the AR session, the image with the masking to the user devices with a default authorization level;
   transmitting, for display in the AR session, the image without the masking to the user devices with a trusted authorization level; and
   requesting, for display during the AR session, approval for access to the image without the masking for the user devices without a trusted authorization level.

2. The method of claim 1 wherein the list of objects includes physical objects, the physical objects including sensitive documents and payment instruments.

3. The method of claim 1 wherein the list of objects includes information, the information including account numbers and social security numbers.

4. The method of claim 1 wherein the generating the database further comprises:
   feeding a machine-learning (ML) engine with historical data that comprises images containing sensitive information;
   training the ML engine, based on the historical data, to recognize graphical patterns associated with the sensitive information; and
   generating the list of objects based on the graphical patterns.

5. The method of claim 1 wherein:
   one of the user devices that is associated with a trusted authorization level is also associated with an administrative authorization level; and
   when the first user device is associated with the administrative authorization level, the first user device is provided the capability to direct the central server to transmit the image without the masking to a user device with a default authorization level.

6. The method of claim 1 wherein the authorization level associated with a user device is reassessed based on a change in an authorization level associated with one of the plurality of user devices during the AR session.

7. The method of claim 1 wherein the authorization level associated with a user device is reassessed based on a relationship between the user device and the object included in the image.

8. The method of claim 1 wherein the masking comprises blurring the object in the image.

9. The method of claim 1 further comprising, when the image includes an object from the list of objects, transmitting a request to the first user device for authorization to transmit the image without the masking to other user devices.

10. A secure, distributed, augmented-reality (AR) system, the system comprising:
a central server comprising:
a processor; and
a non-transitory memory, said memory storing a database comprising a list of objects associated with sensitive information; and
a plurality of user devices in communication with the central server, each user device comprising:
a camera;
a screen configured to provide a device user with an AR experience; and
a communication interface;
wherein:
the central server is configured to receive requests from the plurality of user devices to participate in an AR session;
the central server is configured to determine an authorization level to associate with each of the plurality of user devices, wherein said authorization level is one of a plurality of predetermined authorization levels, said plurality of predetermined authorization levels comprising a default level and a trusted level;
the central server is configured to receive, from a first one of the plurality of user devices, an image that was scanned in via the camera of the first user device;
the central server is configured to process the image, using image processing software to recognize an object present in the image, and using both pattern matching and parsing using artificial intelligence (AI) vision and natural language processing (NLP), to determine if the image includes an object from the list of objects, the pattern matching comprising detecting at least one alphanumeric sequence selected from at least one of an address, an account number, and a social security number;
when the image includes an object from the list of objects, the central server is configured to determine whether storing the image without the masking in the memory is consistent with applicable data privacy laws and regulations; and
when storing the image without the masking in the memory is inconsistent with applicable data privacy laws and regulations, mask the object in the image, and store the image with the masking;
the central server is configured to transmit:
the image with the masking to the user devices with a default authorization level for display during the AR session; and
the image without the masking to the user devices with a trusted authorization level for display during the AR session; and
the central server is configured to request approval for access to the image without the masking for the user devices without a trusted authorization level for display during the AR session.

11. The system of claim 10 wherein the list of objects includes physical objects, the physical objects including sensitive documents and payment instruments.

12. The system of claim 10 wherein the list of objects includes information, the information including account numbers and social security numbers.

13. The system of claim 10 further comprising a machine-learning (ML) engine, wherein the database is generated by:
feeding the ML engine with historical data that comprises images containing sensitive information;
training the ML engine, based on the historical data, to recognize graphical patterns associated with the sensitive information; and
generating the list of objects based on the graphical patterns.

14. The system of claim 10 wherein:
one of the user devices that is associated with a trusted authorization level is also associated with an administrative authorization level; and
when the first user device is associated with the administrative authorization level, the first user device is provided the capability to direct the central server to transmit the image without the masking to a user device with a default authorization level.

15. The system of claim 10 wherein the authorization level associated with a user device is reassessed based on a change in an authorization level associated with one of the plurality of user devices during the AR session.

16. The system of claim 10 wherein the authorization level associated with a user device is reassessed based on a relationship between the user device and the object included in the image.

17. The system of claim 10 wherein the mask comprises a blurring of the object in the image.

18. The system of claim 10 wherein, when the image includes an object from the list of objects, the central server is further configured to transmit a request to the first user device for authorization to transmit the image without the masking to other user devices.

* * * * *